(12) United States Patent
Scheibe

(10) Patent No.: US 10,110,065 B2
(45) Date of Patent: Oct. 23, 2018

(54) ELECTRONIC CIRCUIT FOR TRANSMITTING POWER FROM A TERMINAL SIDE TO A SENSOR SIDE AND METHOD OF USE

(71) Applicant: Endress+Hauser Conducta GmbH+Co. KG, Gerlingen (DE)

(72) Inventor: Sven-Matthias Scheibe, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 132 days.

(21) Appl. No.: 15/235,814

(22) Filed: Aug. 12, 2016

(65) Prior Publication Data

US 2017/0047776 A1 Feb. 16, 2017

(30) Foreign Application Priority Data

Aug. 12, 2015 (DE) .......................... 10 2015 113 279

(51) Int. Cl.
*H02J 50/10* (2016.01)
(52) U.S. Cl.
CPC ................................... *H02J 50/10* (2016.02)
(58) Field of Classification Search
CPC ............. H02J 7/007; H02J 7/025; H02J 50/10
See application file for complete search history.

(56) References Cited

U.S. PATENT DOCUMENTS

2014/0074185 A1* 3/2014 Fell ...................... A61N 1/3787
607/61

FOREIGN PATENT DOCUMENTS

| CN | 1156924 A | 8/1997 |
|---|---|---|
| CN | 104214046 A | 12/2014 |
| DE | 102 16 330 A1 | 10/2003 |
| DE | 20 2012 102 446 U1 | 7/2012 |

OTHER PUBLICATIONS

Search Report for German Patent Application No. 10 2015 113 279.6, German Patent Office, dated Apr. 13, 2016, 10 pp.
PTB: Die gesetzlichen Einheiten in Deutschland. Braunschweig; Berlin: Physikalisch-Technische Bundesanstalt—Nationales Metrologieinstitut, Jun. 2015, 11 pp.
Roddeck, Werner, Einführung in die Mechatronik 2. Auflage, ISBN 978-3-519-16357.2, Wiesbaden: Springer Fachmedien, 2003, Kapitel 7: Prozessdatenberarbeitung und Regelungstechnik, S. 238-386.
Wikipedia, Regelkreis, https://de.wikipedia.org/wiki/Regelkreis, 34 pp. (last updated Mar. 29, 2016; last accessed Apr. 11, 2016).

* cited by examiner

*Primary Examiner* — Robert DeBeradinis
(74) *Attorney, Agent, or Firm* — Mark A. Logan; PatServe

(57) ABSTRACT

The present disclosure includes an electronic circuit for use in process automation for transferring electrical energy from a terminal element to a sensor over an inductively coupled interface. The sensor measures the power it receives over the inductive interface and compares this value to a target power value. The difference between the actual and target values is communicated back to the terminal element. The terminal element adjusts its power output to the sensor to minimize this difference. The disclosure includes the use of the electronic circuit and a sensor arrangement comprising the electronic circuit, as well as a method for transmitting power.

17 Claims, 2 Drawing Sheets

ELECTRONIC CIRCUIT FOR TRANSMITTING POWER FROM A TERMINAL SIDE TO A SENSOR SIDE AND METHOD OF USE

CROSS-REFERENCE TO RELATED APPLICATIONS

The present application is related to and claims the priority benefit of German Patent Application No. 10 2015 113 279.6, filed on Aug. 12, 2015, the entire contents of which are incorporated herein by reference.

TECHNICAL FIELD

The present disclosure relates to an electronic circuit for use in process automation for transmitting power from a terminal side to a sensor side. The present disclosure also relates to the use of such a circuit. The present disclosure further relates to a measuring device comprising such a circuit. The present disclosure relates, moreover, to method for transmitting power from a terminal side to a sensor side.

BACKGROUND

The problem on which the present disclosure is based will be explained on the basis of the energy and data transfer between a terminal side with a transmitter and a sensor side with a sensor.

Generally, a cable is connected to a transmitter in order to connect it to a sensor. The connection between the cable and the sensor often takes place via a plug-in connection, by means of, for example, galvanically decoupled—in particular, inductive—interfaces. In this way, electrical signals may be transmitted in a contactless manner. As a result of this galvanic isolation, advantages are seen with respect to corrosion protection, potential isolation, prevention of mechanical wear and tear of the connectors, etc. The applicant sells such systems under the designation "Memosens". Other similar designs are, for example, "Memosens" from the company Knick, "ISM" from Mettler-Toledo, the "ARC" system from Hamilton and "SMARTSENS" from Krohne.

The aforementioned inductive interfaces are generally realized as a system with two coils which are plugged into one another by means of the aforementioned plug-in connection, for example. Typically, both data (in both directions) and energy (from the terminal side to the sensor side) are transmitted. In doing so, the energy must be high enough to provide the connected sensor with sufficient energy and thus ensure a long-term measurement operation.

The challenge presented by such contactless energy and data transfer consists in the rough operating and environmental conditions in the industrial environment. This requirement has the effect that the tolerance ranges for the components (inductances of the coils, etc.) that must be specified as a result of the environmental conditions (temperature, air humidity, etc.) are particularly broad. Temperature ranges of −20° C. up to 135° C. occur. If assemblies are, for example, designed for typical temperatures at which medical devices are sterilized (typically above 120° C.), then significantly modified inductance values must, for example, be expected at high temperatures for the coils used in these assemblies.

With respect to the tolerances, what is particularly to be pointed out is the coupling transformer, which inductively couples the coil on the terminal side with the coil on the sensor side or forms a transformer with these two coupled coils. In this coupling system, the mechanical pairing of the two partner coils is decisive, and a wide dispersion of the inductive coupling may result in problems with respect to the transmission behavior.

One possibility for solving the problem consists in adjusting the power transmitted from the terminal side to the sensor side, such that the sensor is supplied with sufficient power under all environmental conditions and interferences. This may, however, result in the maximum permissible total power consumption being exceeded. In addition, too much power that is not necessary is often transmitted.

Another possibility for solving the problem includes, additionally, an element for temperature compensation. In this way, the temperature behavior of the inductive coupling may be compensated. The stability of the sensor-side power supply is thus improved. Still, this measure cannot counteract all environmental conditions and interferences. It may also occur in this case that the total power is exceeded if the sensor load is too high.

With another possibility for solving the problem, the power consumption of the inductive coupling is determined on the terminal side, and, subsequently, the coupling is regulated to a corresponding target value. With this method, the total power consumption of the inductive coupling can be kept constant. The power delivered to the sensor can, however, still fluctuate, depending upon the type of sensor, and also under the aforementioned environmental conditions and interferences.

None of the solutions mentioned can, however, keep the power provided to the sensor constant through all environmental conditions and interferences. In part, significant energy reserves must be provided, which are then not available for the actual purpose—namely, the sensing of the measured value—of the sensor electronics. Furthermore, it cannot be ensured that the power provided on the terminal side is also actually available to the sensor. All known and aforementioned topologies are unable to provide the sensor with the power it really needs. The specific need of the sensor, considering all the disturbance variables, is not taken into account.

BRIEF SUMMARY OF THE INVENTION

The present application discloses an electronic circuit for transmitting power in a process automation device. The circuit comprises a first inductive interface; a first intelligent unit; a power source configured to supply power to the first inductive interface; a second inductive interface coupled to the first inductive interface such that the first inductive interface transfers power to the second inductive interface; a measuring element configured to measure power output by the second inductive interface, the measuring element outputting the value of the measured power; and a second intelligent unit. The second intelligent unit takes as input the value of the measured power and a target power value and produces a control deviation and communicates the control deviation to the first intelligent unit. The first intelligent unit operates on the control deviation to control the power source to minimize the control deviation. The target power value can be variable and adjustable.

In one embodiment of the electronic circuit, the circuit transmits digital data between the first inductive interface and the second inductive interface, and the first inductive interface and the second inductive interface are designed to transmit the data using amplitude shift keying. In another embodiment, the electronic circuit further comprises a modulator that modulates the digital data onto the electronic circuit's output. In another embodiment, the electronic circuit further comprises a limiter that limits the power supplied by the power source to a maximum value. The first intelligent unit communicates to the second intelligent unit that the limiter is limiting the power when the limiter is limiting the power. The maximum value of the limiter is variable and adjustable, and the first intelligent unit adjusts the maximum value.

Also disclosed is a sensor arrangement of process automation, comprising an electronic circuit which comprises a first inductive interface; a first intelligent unit; a power source configured to supply power to the first inductive interface; a second inductive interface coupled to the first inductive interface such that the first inductive interface transfers power to the second inductive interface; a measuring element configured to measure power output by the second inductive interface, the measuring element outputting the value of the measured power; and a second intelligent unit. The second intelligent unit takes as input the value of the measured power and a target power value and produces a control deviation and communicates the control deviation to the first intelligent unit. The first intelligent unit operates on the control deviation to control the power source to minimize the control deviation.

In some embodiments the electronic circuit of the sensor arrangement transmits digital data between the first inductive interface and the second inductive interface, and the first inductive interface and the second inductive interface are designed to transmit the data using amplitude shift keying. In some embodiments of the sensor arrangement the electronic circuit further comprises a modulator that modulates the digital data onto the modulator's output. Some embodiments of the sensor arrangement contain a limiter in the electronic circuit that limits the power supplied by the power source to a maximum value. The maximum value is variable and adjustable, and the first intelligent unit can adjust the maximum value.

In an embodiment of the sensor arrangement, the sensor arrangement comprises a terminal element and a consumer, wherein the terminal element is connected to the consumer via the first inductive interface and the second inductive interface. The consumer can be a sensor.

A method for transmitting power from a terminal element to a sensor is also disclosed. The method comprises the steps of: transmitting the power from an inductive interface on the terminal element to an inductive interface on the sensor; measuring the power on the sensor; determining a deviation between the measured power and a target power on the sensor; communicating the deviation to the terminal element; and minimizing the deviation on the terminal element. The method can also include limited the power to be transmitted to a maximum value, if a power higher than the maximum value is to be transmitted.

BRIEF DESCRIPTION OF THE DRAWINGS

The accompanying drawings, which are incorporated in and constitute a part of this specification, show certain aspects of the present disclosure and, together with the description, help explain some of the principles associated with the disclosed implementations, wherein.

In the figures, the same features are marked with the same reference symbols.

DETAILED DESCRIPTION

Figure 1:
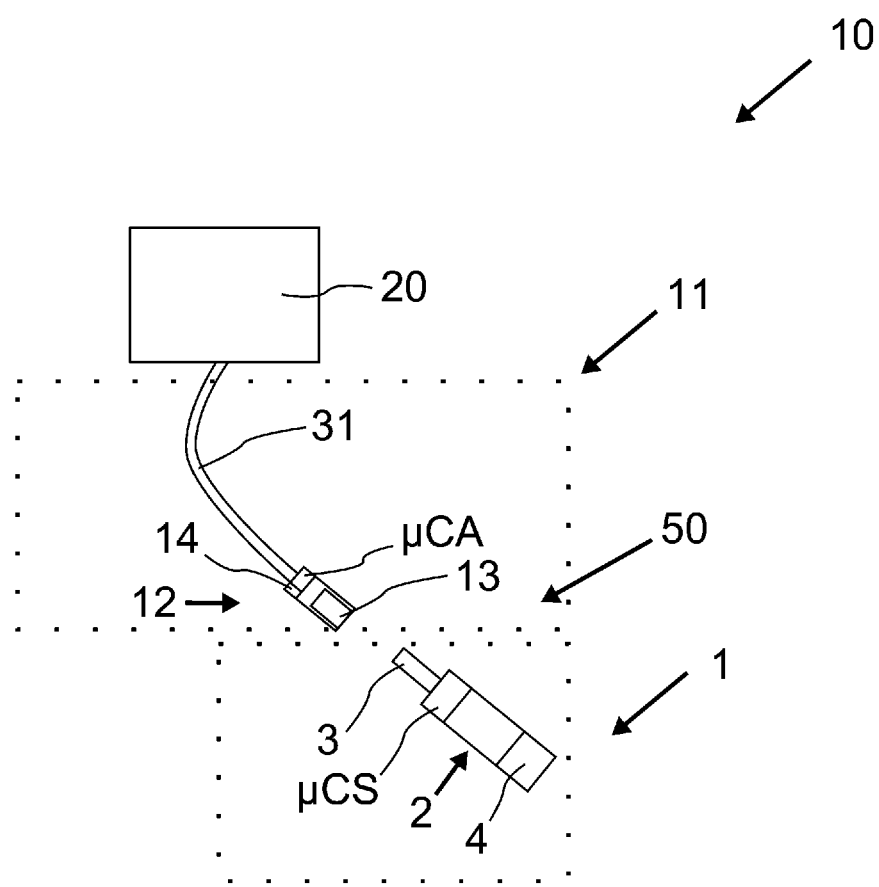
FIG. 1 shows a sensor arrangement according to the present disclosure.

The present disclosure is based upon the aim of developing a circuit and a method that ensures that the power provided to the sensor is kept constant under all environmental conditions and interferences.

The aim is achieved by means of a circuit for transmitting power from a terminal side to a sensor side with a sensor, the terminal side comprising a first inductive interface, a first intelligent unit comprising a controller, and a source for transmitting the power as a correcting variable, and the sensor side comprising a second inductive interface corresponding to the first interface—wherein the first interface and the second interface are designed to transmit the power—a power measuring circuit for measuring the power at the second interface as a controlled variable, and a second intelligent unit, which determines a control deviation of the power at the second interface from a sensor-specific target power as a reference variable and communicates the control deviation to the first intelligent unit, wherein the controller minimizes the control deviation using the source, by increasing or decreasing the power.

In such an embodiment, the sensor is an active component of the control loop. Thus, the measurement deviation is determined where it occurs, viz., in the sensor, wherein all disturbance variables in the control loop are taken into consideration. The sensor load as a disturbance variable is thereby eliminated. Power losses are minimized—for example, in the power supply unit on the side of the sensor. In this way, more power is available for the measuring task of the sensor. Since constant conditions prevail on the side of the sensor, the communication quality can be improved.

In one embodiment, the source is designed to be a voltage source. Furthermore, in an embodiment, the voltage may be regulated instead of the power. The voltage transmitted is thus the correcting variable.

The electronic circuit may also transmit digital data between the terminal side and the sensor side, and the first interface and the second interface are designed to transmit the data, wherein the electronic circuit transmits the digital data using amplitude shift keying.

In one advantageous development, the electronic circuit comprises, on the terminal side, a modulator that modulates the digital data onto its output.

In another advantageous embodiment, the controller suspends its control intervention while digital data are being sent.

In another embodiment, the electronic circuit comprises, on the terminal side, a limiter that limits the maximum power to be transmitted to a maximum value. This maximum value ensures that a power limit on the side of the terminal element is not exceeded, which could occur, for example, as a result of faulty communication, defective electronics, etc.

Advantageously, the first intelligent unit communicates to the second intelligent unit that the limiter limits the power to be transmitted. If the limiter limits the power to the sensor, it is then able to communicate this to the sensor using its own communication. Thus, the sensor can respond accordingly, i.e., decrease the required power, e.g., by reducing the measuring frequency.

In at least one embodiment, the maximum value of the limiter is variable and adjustable, and the first intelligent unit adjusts the maximum value. The maximum value can, for example, be adjusted by the superordinate unit. The sensor can thus set a higher operating point—depending upon the requirements.

The target power as a reference variable may also be variable and adjustable. In this way, various sensor classes with different measuring frequencies can, for example, be implemented, since a higher measuring frequency also implies a higher power consumption.

The aim is further achieved by the use of an electronic circuit as described above in process automation.

The aim is further achieved by a sensor arrangement of process automation, comprising an electronic circuit as described above.

In at least one embodiment, the sensor arrangement comprises a terminal element comprising the terminal side and a consumer—in particular, a sensor—comprising the sensor side, wherein the terminal element is connected to the consumer via the first interface and the second interface.

The aim is further achieved by a method for transmitting power from a terminal side to a sensor side with a sensor, comprising the steps of transmitting the power, measuring the power on the sensor side, determining a deviation between this power and a target power on the sensor side, communicating this deviation to the terminal side, and minimizing this deviation on the terminal side.

In one advantageous embodiment, the method further comprises the step of limiting the power to be transmitted to a maximum value, if a power higher than the maximum value is to be transmitted.

A sensor arrangement 10 according to the invention is shown in FIG. 1. The sensor arrangement comprises a sensor 1 and a terminal element 11. The terminal element 11 comprises a cable 31 together with a first interface 13. The cable 31 is connected on the sensor side of superordinate unit 20; the other end of the cable 31 comprises the first interface 13. The sensor 1 communicates with the superordinate unit 20 via a second interface 3. The second interface 3 is designed to be complementary to the first interface 13. The first and second interfaces 13 and 3 are designed to be galvanically isolated—in particular, as inductive interfaces that can be coupled with each other by means of a mechanical plug-in connection. The mechanical plug-in connection is hermetically sealed so that no liquid, such as the medium to be measured, air, or dust can enter from the outside.

In the example, the superordinate unit 20 is a transmitter. The transmitter in turn is connected to a control system (not shown). In one embodiment, the sensor 1 communicates directly with a control system. Via the interfaces 3, 13, data (bi-directionally) and energy (uni-directionally, i.e., from the terminal element 11 to the sensor 1) are sent or transmitted. The sensor arrangement 10 is predominantly used in process automation.

The sensor 1 therefore comprises at least one sensor element 4 for sensing a measured variable of the process automation. The sensor 1 is then something like a pH sensor and also an ISFET—in general, an ion-selective sensor, a sensor for the measurement of the redox potential, of the absorption of electromagnetic waves in the medium, e.g., with wavelengths in the UV, IR, and/or visible range, of oxygen, of conductivity, of turbidity, of the concentration of non-metallic materials, or of the temperature with the respectively appropriate measured variable.

The sensor 1 further comprises a first coupling body 2, which comprises the interface 3. As mentioned, the interface 3 is designed to transmit a value dependent upon the measured variable to an interface 13. The sensor 1 comprises a data processing unit μCS, such as a microcontroller, which processes the values of the measured variable, e.g., converts them into another data format. In this way, an averaging, a preprocessing, and a digital conversion may be carried out by the data processing unit μCS.

The sensor 1 can be connected via the interfaces 3, 13 to the terminal element 11 and ultimately to a superordinate unit 20. The superordinate unit 20 is, for example, a transmitter or a control station. The data processing unit μCS converts the value dependent upon the measured value (i.e., the measurement signal of the sensor element 4) into a protocol that can be understood by the transmitter or the control station. Examples in this respect are, for instance, the proprietary Memosens protocol or, also, HART, wirelessHART, Modbus, Profibus Fieldbus, WLAN, ZigBee, Bluetooth, or RFID. This conversion may also take place in a separate communication unit instead of the data processing unit, where the communication unit is arranged on the side of the sensor 1 or the terminal element 11. The protocols mentioned also include wireless protocols, so that a corresponding communication unit comprises a wireless module. The interfaces 3, 13 are therefore designed for the bi-directional communication between the sensor 1 and the superordinate unit 20. As mentioned, the interfaces 3, 13 also ensure the energy supply of the sensor 1, in addition to the communication.

The terminal element 11 comprises the interface 13, wherein the interface 13 is designed to be complementary to the interface 3. The terminal element 11 also comprises a data processing unit μCA. The data processing unit μCA may be used as a repeater for the signal sent. Furthermore, the data processing unit μCA can convert or modify the protocol. For example, data in a proprietary protocol can be transmitted from the sensor 1 to the terminal element 11, whereas the data processing unit μCA on the side of the terminal element 11 converts this proprietary protocol into a bus protocol. The terminal element 11 comprises a modulator 14, which modulates the data onto the terminal element's output. The modulator 14 may, for example, be designed to be a load modulator. Alternatively, the data processing unit μCA can also modulate the data. The data are transmitted using amplitude shift keying.

The terminal element 11 further comprises a cylindrical coupling body 12, which is designed to be complementary to the coupling body 2 and which, with a sleeve-like end section, can be slipped onto the coupling body 2, whereby the interface 13 is plugged into the interface 3. A similar arrangement, in which the interface 13 is designed to be sleeve-like, and the interface 3 plug-like, is possible without any inventive effort.

Figure 2:
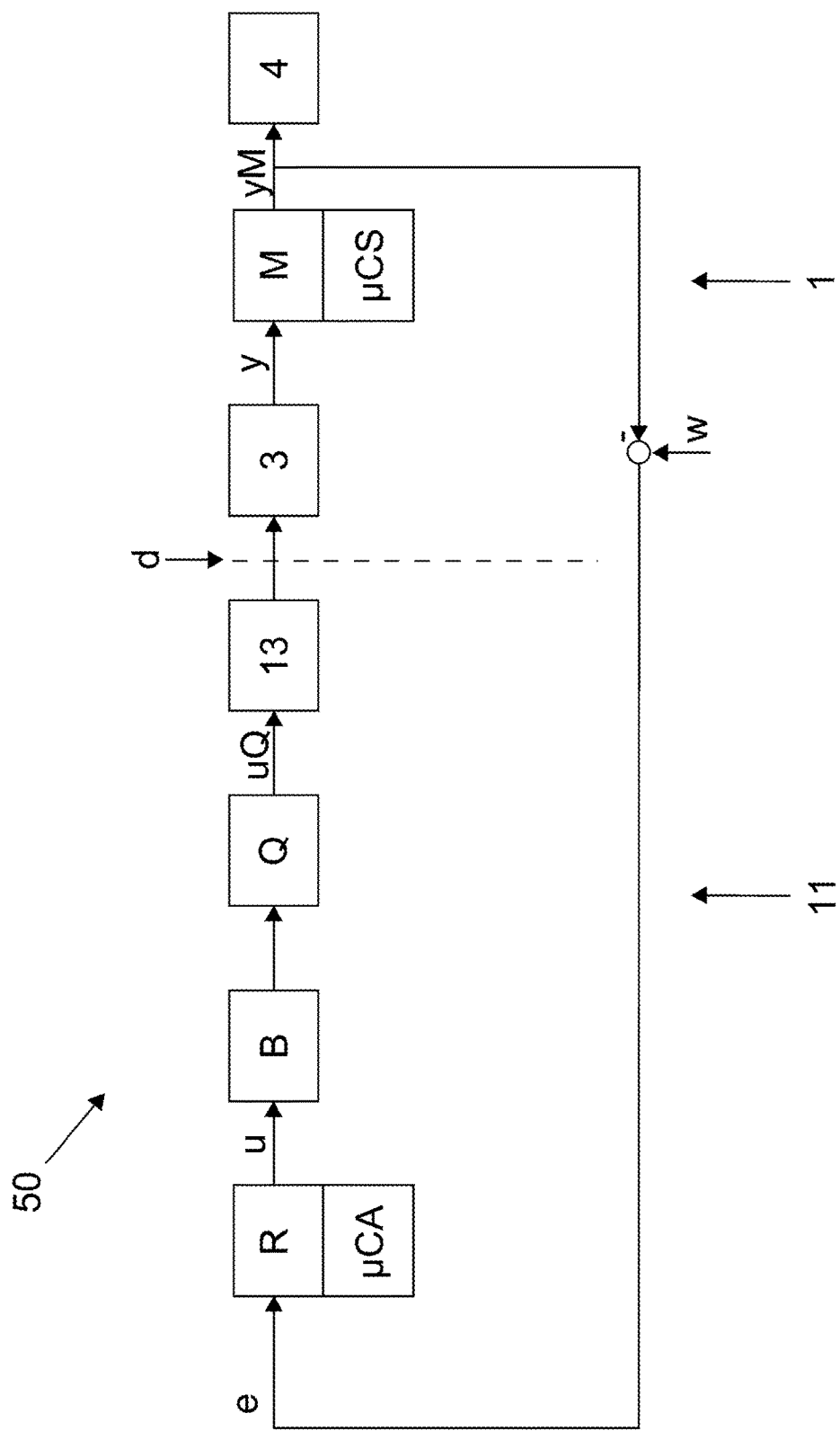
FIG. 2 shows a block diagram of a control circuit comprising the electronic circuit according to the present disclosure.

FIG. 2 shows a block diagram of a control circuit comprising the electronic circuit 50 according to the present disclosure. Here, the electronic circuit 50 comprises components on the sides of both the sensor 1 and the terminal element 11.

The general structure of a control circuit is to be explained briefly. The controlled variable y (actual value)—in this case, the power on the side of the sensor 1—is compared to the reference variable w (target value)—in this case the power actually required by the sensor 1. The control deviation e as the difference between the actual value and the target value (shown here is the control difference e=w−yM) is delivered to the controller R, which generates from it a correcting variable u in accordance with the desired time behavior of the control circuit. The actuator, generally a source designed, for example, as a voltage source Q on the side of the terminal element 11, can be a component of the controller R, but can also be designed to be separate from it.

The correcting variable is generally to be designated as "u," and, in the signal sequence after the actuator Q, as "uQ." The disturbance variable d affects the control path. The measuring element M—in this case, a circuit for measuring the power on the side of the sensor 1—can comprise a time delay, which must also be taken into consideration in fast control paths. It is intended to minimize the control deviation e.

The disturbance variable d comprises all possibly occurring disturbances from the ideal case, such as the distance of the interfaces 3, 13, the temperature, design, component tolerances, etc.

The measuring element M is a circuit for measuring the power, such as a combined current and voltage measurement. The controlled variable y after the measuring element M is to be designated as "yM."

The source Q—such as the voltage source—is designed, for example, as an inverter. In one embodiment, the source Q is designed as a class E amplifier.

The second intelligent unit μCS on the side of the sensor 1 or the power measuring circuit M continuously determines the power output of the inductive coupling 3 and compares it to its own individual (sensor-specific) target value w. The control deviation e generated from it is transmitted to the first intelligent unit μCA on the side of the terminal element 11 using the communication protocol. The data processing unit μCA adjusts the control path, consisting of the source Q and the inductive coupling 13, via the controller R, such that the control deviation e is minimized to a smaller value—in the best case, to zero.

The sensor is an active component of the control loop. Thus, the measurement deviation is determined where it occurs—viz., in the sensor 1—and all disturbance variables d are taken into consideration in the control loop. In doing so, the sensor load as a disturbance variable is eliminated. Power losses are minimized—for example, in the power supply unit on the side of the sensor 1. In this way, more power is available for the measuring task of the sensor 1. Since constant conditions prevail on the side of the sensor 1, the communication quality can be improved.

The target value w can be adjusted individually for each sensor or each sensor type. In a first embodiment, the target value w is to be permanently stored in the sensor 1. More precisely, the target value w is stored in the intelligent unit μCS. In a second embodiment, the target value w is adjusted via the superordinate unit 20 and changed accordingly in the intelligent unit μCS. In case of a changeable target value w, there is, however, a "standard target value," which is set, for example, in the boot phase of the sensor. This standard target value may also be used as the target value that is used in case of an error.

The superordinate unit 20 may, for example, retrieve the target value w from a database and communicate it based upon a unique identifier of the sensor 1. In another embodiment, several target values exist per sensor 1. In this way, various sensor classes may be integrated into one sensor. For example, the sensor classes may have different measured value determination frequencies, such as 0.3 Hz, 1 Hz, or 3 Hz. This because the more often a measurement is taken, the higher the power consumption is. The adjustments may be taken automatically, depending upon the terminal element 11, the superordinate unit 20, or as desired by the user.

In addition, the control loop comprises a limiter B. It ensures that a power limit on the side of the terminal element 11—for example, 15 mW—is not exceeded, which could occur, for example, as a result of faulty communication, defective electronics, etc. If the limiter B limits the power to the sensor 1, it is then able to communicate this to the sensor 1 using its own communication. In this way, the sensor 1 can respond accordingly—for example, by reducing the measured value determination frequency. The power limit is variable and adjustable by the first intelligent unit μCA on the side of the terminal element 11. The adjustment of this power limit by the first intelligent unit μCA is carried out in the same manner as already explained above for the target value w, which is adjusted by the second intelligent unit μCS.

The invention claimed is:

1. An electronic circuit for transmitting power in a process automation device comprising:
    a first inductive interface;
    a first intelligent unit;
    a power source configured to supply power to the first inductive interface;
    a limiter that limits the power supplied by the power source to a maximum value;
    a second inductive interface coupled to the first inductive interface such that the first inductive interface transfers power to the second inductive interface;
    a measuring element configured to measure power output by the second inductive interface; the measuring element outputting the value of the measured power; and
    a second intelligent unit, wherein the second intelligent unit takes as input the value of the measured power and a target power value, produces a control deviation, and communicates the control deviation to the first intelligent unit, wherein the first intelligent unit operates on the control deviation to control the power source to minimize the control deviation.

2. The electronic circuit according to claim 1, wherein the electronic circuit transmits digital data between the first inductive interface and the second inductive interface, and the first inductive interface and the second inductive interface are embodied to transmit the data using amplitude shift keying.

3. The electronic circuit according to claim 2, the electronic circuit further comprising a modulator that modulates the digital data onto an output of the electronic circuit.

4. The electronic circuit according to claim 1, wherein the first intelligent unit communicates to the second intelligent unit that the limiter is limiting the power when the limiter limits the power.

5. The electronic circuit according to claim 1, wherein the maximum value of the limiter is variable and adjustable, and the first intelligent unit adjusts the maximum value.

6. The electronic circuit according to claim 1, wherein the target power value is variable and adjustable.

7. The electronic circuit according to claim 1, wherein the electronic circuit is employed in a process automation device.

8. A sensor arrangement of process automation comprising:
    an electronic circuit comprising:
        a first inductive interface;
        a first intelligent unit;
        a power source configured to supply power to the first inductive interface;
        a limiter that limits the power supplied by the power source to a maximum value;
        a second inductive interface coupled to the first inductive interface such that the first inductive interface transfers power to the second inductive interface;

a measuring element configured to measure power output by the second inductive interface; the measuring element outputting the value of the measured power; and a second intelligent unit, wherein the second intelligent unit takes as input the value of the measured power and a target power value and produces a control deviation and communicates the control deviation to the first intelligent unit, wherein the first intelligent unit operates on the control deviation to control the power source to minimize the control deviation.

9. The sensor arrangement of claim 8, wherein the electronic circuit transmits digital data between the first inductive interface and the second inductive interface, and the first inductive interface and the second inductive interface are embodied to transmit the data using amplitude shift keying.

10. The sensor arrangement of claim 8, the electronic circuit further comprising a modulator that modulates the digital data onto an output of the modulator.

11. The sensor arrangement of claim 8, wherein the maximum value of the limiter is variable and adjustable, and the first intelligent unit adjusts the maximum value.

12. The sensor arrangement of claim 8, wherein the target power value is variable and adjustable.

13. The sensor arrangement according to claim 8, wherein the sensor arrangement comprises a terminal element and a consumer, wherein the terminal element is connected to the consumer via the first inductive interface and the second inductive interface.

14. The sensor arrangement according to claim 13, wherein the consumer is a sensor.

15. A method for transmitting power from a terminal element to a sensor comprising the steps of:
transmitting the power from a first inductive interface on the terminal element to a second inductive interface on the sensor;
limiting the power to be transmitted to a maximum value if a power higher than the maximum value is to be transmitted;
measuring the power on the sensor;
determining a deviation between the measured power and a target power on the sensor;
communicating the deviation to the terminal element; and
minimizing the deviation on the terminal element by controlling the transmitted power.

16. The method according to claim 15, wherein the maximum value is variable and adjustable, and the terminal element adjusts the maximum value.

17. The method according to claim 15, further comprising the step of:
transmitting digital data between the first inductive interface and the second inductive interface, wherein the first inductive interface and the second inductive interface are embodied to transmit the data using amplitude shift keying.

* * * * *